April 14, 1959
JEAN-JACQUES BESSIRE
2,882,474
ELECTRIC CURRENT GENERATOR FOR SYNCHRONIZED
DRIVE OF AT LEAST TWO MOTORS
Filed May 7, 1956
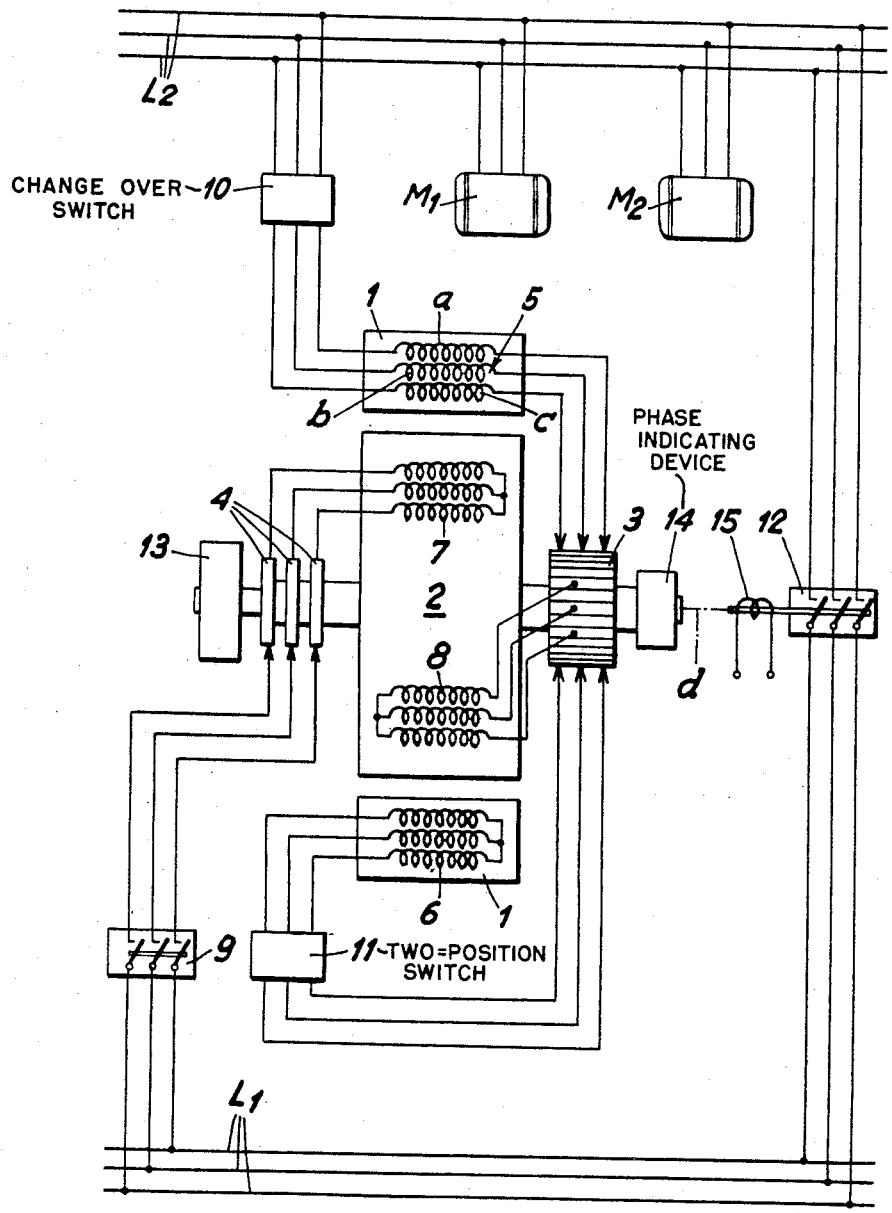
Inventor: Jean-Jacques Bessire

United States Patent Office 2,882,474
Patented Apr. 14, 1959

2,882,474

ELECTRIC CURRENT GENERATOR FOR SYNCHRONIZED DRIVE OF AT LEAST TWO MOTORS

Jean-Jacques Bessire, Bienne, Switzerland, assignor to H. & J. J. Bessire, S.A., Bienne, Switzerland Application May 7, 1956, Serial No. 583,013

Claims priority, application Switzerland May 6, 1955

3 Claims. (Cl. 318—85)

This application relates to interlocking systems, and more particularly to an electric current generator intended for the synchronized drive of two or more electric motors.

In many varieties of electric systems provided with apparatus which are driven by electric motors, it is necessary that these apparatus may start, run and come to standstill locked in step with each other. This is the case, for instance, of the sound recording and reproducing systems, where it is essential that the sound recording or reproducing apparatus be always kept in step with the projection apparatus. The synchronized operation of such apparatus could be attained by the provision of mechanical links, such as shafts, gears and the like. This solution, however, results not only in a higher intricacy of the construction and larger over-all dimensions of the system, but in most cases it is not even practicable because of the distances separating the different apparatus which are to be interlocked.

Various systems have been already proposed to provide interlock or synchronism between several motors. In these systems each apparatus is generally driven by a single electric motor which is preferably of the synchronous type. The motors are all connected to a common supply line, the voltage and frequency of which may increase from a minimum value up to the rated value. The common supply line of the motors is in turn supplied by a converter set of machines comprising a synchronous motor driving a synchronous generator, and a transformer. This group will supply the motors with increasing voltage, which varies from a minimum value up to the value of the main supply voltage at a frequency which also varies from "zero" up to the main supply frequency.

The disadvantage of such a system is that it comprises at least two separate rotating machines, so that the overall dimensions of the plant and consequently the cost thereof are in most cases exceedingly high.

It is therefore a general object of this invention to provide a system for the synchronous drive of at least two A.-C. motors, avoiding the use of a group comprising several electric machines.

Another object of this invention is to provide an electric machine so designed that it may be substituted for the several machines forming the groups known hitherto for the synchronous drive of electric motors, supplied by a common supply line.

Still another object of the invention is the provision of an electric machine which successively operates as a generator, a frequency converter and a transformer.

These objects are attained by providing an electric machine comprising a stator, a rotor, a commutator and slip rings mounted on the shaft of the rotor, wherein both rotor and stator are provided with two separate windings. The first winding of the rotor is connected to the slip rings and the second winding thereof is connected to the commutator. The first winding of the stator is connected at one end thereof to the brushes of the commutator and at the other end to the common supply line of the motors to be driven, and the second winding of the stator is connected to switch means which may alternately short-circuit the ends of said second winding or connect them to the brushes of the commutator. In operation, the second winding of the stator, when it is short-circuited by the switching means, and the first winding of the rotor connected to the slip rings, operate as the field-winding and the armature, respectively, of a self-starting induction motor, and said second winding of the stator, when connected to the commutator, exerts a braking action on the rotor. The first and second windings of the rotor form together a frequency converter and the first winding of the stator and the first winding of the rotor operate as the field-winding and the armature, respectively, of a synchronous motor when the rotor runs at the synchronous speed and as the secondary and the primary, respectively, of a transformer when the rotor runs at a speed lower than the synchronous speed or comes to standstill.

In a preferred embodiment of the invention a flywheel is mounted on the shaft of the rotor in order to prevent the rotor from being subjected to exceedingly high accelerations or decelerations.

In the case where the operating voltage of the driven motors is the same of that of the main supply line, switching means may be provided for, which directly connect the motors to the main supply line, when these motors run at the full speed. In this case, however, it is necessary that the current in the main supply line and the current in the common supply line of the motors be in phase coincidence. Accordingly, the machine of this invention comprises a phase indicating device mounted on the shaft of the rotor, this device preventing the switch means from connecting the motors to the main supply line, if the current in this line and that in the common line of the motors are not in phase coincidence.

For a better understanding of this invention, reference may be had to the following description taken in connection with the accompanying drawing, the single figure of which diagrammatically illustrates by way of example a preferred embodiment of the machine of this invention and the electric circuit of a system comprising two driven motors.

From the figure of the drawings it appears that the electric machine comprises a stator 1 and a rotor 2. On the shaft of rotor 2 are mounted a commutator 3 and three slip rings 4. Stator 1 is provided with two separate windings, 5 and 6, respectively, which in the embodiment shown are each three-phase windings. Rotor 2 is also provided with two separate three-phase windings, 7 and 8, respectively, the first of which is connected to the slip rings 4 and the second of which is connected to the commutator 3. The drawing further shows the main supply line $L_1$ which, for example, may be a three-wire line at 220 volts and 50 c.p.s. A main switch 9 may connect the slip rings 4 to the main supply line $L_1$.

The first winding 5 of stator 1 comprises three coils $a$, $b$ and $c$, each coil being connected at one end to one brush of commutator 3 and at the other end thereof to a change-over switch 10, which may be actuated to take three positions. In one position the change-over switch 10 connects the three coils $a$, $b$ and $c$ to an auxiliary three-wire line $L_2$, in the second position it holds two of them, say coils $a$ and $b$, connected to the line $L_2$ while the third coil $c$ is disconnected from the line $L_2$. In the third position of the change-over switch 10 coils $a$, $b$ and $c$ are all disconnected from the auxiliary line $L_2$.

The winding 6 of stator 1 comprises three star-connected coils, the free ends of which are connected to a two-position switch 11, which may either short-circuit the three coils of winding 6 or connect them to commutator 3.

Two motors $M_1$ and $M_2$, which are intended for driving the apparatus of the system, not shown, are connected to the auxiliary line $L_2$. On the drawing there are shown only two motors, but it is obvious that more than two motors may be supplied by the auxiliary line $L_2$. The motors $M_1$ and $M_2$ are preferably of the synchronous induction type and, as will be discussed hereinafter, they may be supplied also by the main line $L_1$ through the switch 12.

On the shaft of rotor 2 there are mounted a fly-wheel 13 and a phase indicating device 14, the scope and operation of which will become more apparent from the description below. The principle of operation of the machine according to the invention will be obvious from inspection of the circuit shown in the drawing.

When the system is at rest, that is to say that the motors $M_1$ and $M_2$ and the driven apparatus are at rest, the main switch 9 and the switch 12 are both in the open position, while the change-over switch 10 is also in the open position and the two-position switch 11 is in the position in which the three star-connected coils of winding 6 of the stator 1 are short-circuited. To start the machine the main switch 9 will be closed, so that the slip rings 4 of the rotor are connected to the main supply line $L_1$. The winding 7 of the rotor is thus energized and generates an induced current in winding 6 of the stator, such winding being short-circuited by the switch 11, as said hereinabove. This induced current flowing through winding 6 of the stator 1 interacts with the rotating magnetic field set up by the three-phase winding 7, so that the rotor 2 is caused to start. The rotor begins to rotate slowly and its acceleration is damped by the inertia of the fly-wheel 13. In the winding 8, which is connected to commutator 3, a voltage is induced, the value of which depends upon its number of turns and the frequency of which depends upon the slip of the rotor. As a result, during the starting period at the brushes of commutator 3 there will appear an alternating voltage at a frequency which decreases with the increase of the speed of the rotor. This alternating voltage has no effect for the moment, because of the fact that the coils $a$, $b$ and $c$ of the stator winding 5 are open and switch 11 holds the winding 6 disconnected from the commutator 3. As the speed of rotor 2 increases the frequency of the voltage at the brushes of commutator 3 decreases more and more and approaches the value "zero," that is to say that the commutator 3 supplies a direct voltage. As the rotor 2 reaches a speed which is very close to the synchronous speed, the change-over switch 10 is actuated to the second position, whereby, as said hereinabove, the two coils $a$ and $b$ of winding 5 are connected to the auxiliary line $L_2$ while the third coil $c$ is held open. The coils $a$ and $b$ thus establish a circuit comprising the windings of motors $M_1$ and $M_2$, so that a direct current can flow from commutator 3 through coils $a$ and $b$ of stator 1 and the windings of the motors $M_1$ and $M_2$. Coils $a$ and $b$ now act as the direct current field windings of a synchronous motor and set up an excitation field, which causes the rotor 2 to run at the synchronous speed. On the other hand the direct current flowing through the windings of motors $M_1$ and $M_2$ acts as a magnet and locks the rotors of these motors in the same relative position with respect to their stators. Simultaneously with the actuation of the change-over switch 10 the switch 11 is also actuated to the open position in order to break the short-circuit between the coils of the winding 6 just prior to their connection to the brushes of commutator 3.

It will be noted that at this moment the rotor 2 of the machine runs at the synchronous speed but motors $M_1$ and $M_2$ are at stillstand, being locked in this position by the action of the direct current flowing therethrough. To start the motors $M_1$ and $M_2$ the switch 11 will be actuated to the position in which it connects the winding 6 to the brushes of commutator 3. This winding is thus energized and exerts a braking action on the rotor. Simultaneously with the operation of switch 11 the switch 10 is also actuated to the first position and connects the three coils $a$, $b$ and $c$ of winding 5 to the auxiliary line $L_2$. Under the braking action of the winding 6 the speed of the rotor 2 decreases, so that the frequency of the output current of commutator 3 increases more and more. This current is now supplied through the coils $a$, $b$ and $c$ and the line $L_2$ to the motors $M_1$ and $M_2$ which begin to rotate slowly. As the speed of rotor 2 decreases, motors $M_1$ and $M_2$ rotate with increasing speed and are always kept in step. When rotor 2 comes to stillstand the frequency of the current supplied to the auxiliary line $L_2$ is equal to that of the main line $L_1$ and it could be possible therefore to connect directly motors $M_1$ and $M_2$ to the main line $L_1$. This connection however must be effected only if the currents of both lines $L_1$ and $L_2$ are in phase coincidence. For this purpose the switch 12 providing a direct connection between the lines $L_1$ and $L_2$ is controlled by an electromagnet 15, which is in turn controlled by the phase indicating device 14 mounted on the shaft of the rotor 2, as shown in the drawing by the dotted line $d$. The device 14 supplies the electromagnet 15 with a current only when the phases of the currents flowing through the lines $L_1$ and $L_2$ are in coincidence. Phase indicating devices of this type are well known in the art and therefore the operation of the device 14 needs no further description.

In order to synchronously stop the motors $M_1$ and $M_2$ the same operations just described must be effected in the reverse order. Switch 12 is first actuated to the open position, so as to disconnect the auxiliary line $L_2$ from the main supply line $L_1$. Motors $M_1$ and $M_2$ are now supplied with current at the main supply line frequency through the auxiliary line $L_2$, the commutator 3 and the rotor 2 of the machine, which is at standstill. The position of switch 11 is then reversed so as to short-circuit again the winding 6 of the stator 1, thus causing the rotor 2 to start. As the speed of the rotor 2 increases the frequency of the output current of commutator 3 decreases, so that motors $M_1$ and $M_2$ are now supplied with a decreasing frequency and slacken speed in synchronism. When the speed of rotor 2 is close to synchronous speed, the frequency of the current delivered by the commutator 3 is nearly "zero," that is to say that the commutator supplies a direct-current, so that the change-over switch 10 may be changed over to the second position, where the coils $a$ and $b$ are maintained connected to the auxiliary line $L_2$ and coil $c$ is disconnected therefrom. As stated hereinabove, this causes the rotor 2 to be synchronized. Motors $M_1$ and $M_2$ are now supplied with a direct current and are blocked in their standstill positions.

If the entire system must be stopped, the operation of main switch 9 disconnects the machine from the main supply line $L_1$.

For purposes of description it has been assumed that the switches 9 and 12 as well as the change-over switch 10 and the two-way switch 11 are hand actuated. It is obvious however that the operation of all these switches may be effected automatically by means of relays and press-buttons from a control switch board, in the way well known to those skilled in the art.

It will be noted that the motors $M_1$ and $M_2$ are intended to drive apparatus having generally a relatively high inertia. For this reason the starting and the stopping of such apparatus must be effected gradually. Accordingly, the braking action and the starting of rotor 2 of the machine according to the invention must be suitably damped. This result is attained according to the invention by providing a fly-wheel 13 on the shaft of the rotor. During the braking operation the fly-wheel prevents the rotor 2 from stopping abruptly so that the frequency of the output current of commutator 3 gradually increases and motors $M_1$ and $M_1$ begin to rotate slowly. In the same way during the starting operation the fly-wheel 13 prevents rotor 2 from reaching too rapidly the synchronous speed, so that the frequency of the alternating current supplied by the commutator decreases gradually and motors $M_1$ and $M_2$ come slowly to standstill.

Generally the fly-wheel 13 is so designed that the rotor 2 is caused to reach the synchronous speed from standstill in a time interval of about 5 or 7 seconds and is caused to come to standstill from the synchronous speed in a time interval of about 2 or 4 seconds.

From the foregoing it will appear that the electric machine of this invention in the different cycles of operation acts as four different electric machines. At the starting and before the rotor 2 has reached the synchronous speed, the output of the machine is an alternating current at decreasing frequency, and the machine operates therefore as an alternating-current generator with decreasing frequency. As the synchronous speed is reached the commutator 3 delivers a direct-current, so that the machine operates as a converter. When the speed of rotor 2 decreases from the synchronous speed down to standstill, the machine again operates as a generator but with increasing frequency, and when the rotor comes to standstill the windings 5 and 7 operate as the windings of a transformer.

As a result the machine of this invention functions as four electric machines assembled in a single machine. This offers obvious advantages in comparison with the systems known hitherto which comprise several separate machines.

It is to be understood that the disclosed embodiment is illustrative of the machine of the invention. Numerous other arrangements may be devised by those skilled in the art without departing from the spirit and scope of the invention.

For example, it is not essential that the windings of the stator and the rotor of the machine are all of the three-phase type. The second winding 6 of the stator, which serves to exert a braking action on the rotor, may be formed of a single coil. The same holds true in respect of the other windings, though it will be advisable to provide the rotor with a three-phase type winding in order to facilitate the self-starting of the rotor. Further, the motors fed by the machine through the auxiliary line $L_2$ may have different operating characteristics with respect to the horsepower and normal speed ratings, provided that they are devised for operation with the same voltage at the same frequency.

Under particular circumstances it may be desirable that the voltage of the auxiliary line $L_2$ be different from that of the main supply line $L_1$. This may be attained by suitably designing the windings of the machine. In this case the switch 12, the electromagnet 15 and the phase indicating device 14 may be omitted.

What is claimed is:

1. The method of synchronously controlling a plurality of synchronous motors operating from a common multiphase line by means of a rotary dynamoelectric machine having a commutator, first and second multiphase rotor windings, a first multiphase field winding and a second field winding, which comprises, energizing said first multiphase rotor winding from a multiphase supply line while short-circuiting said second field winding so that said machine will begin to operate as an induction motor, then, when said machine is operating as substantially synchronous speed, connecting at least one but less than all the coils of said first multiphase field winding between a corresponding number of conductors of said common line and said commutator to cause D.-C. excitation current to flow in said machine, to cause said machine to operate as a synchronous motor, and to cause D.-C. magnetic blocking of the rotors of said motors to be controlled, and then connecting said second field winding to said commutator for braking the rotor of said machine, while simultaneously connecting the remaining coils of said first multiphase field winding between the remaining conductors of said common line and said commutator for supplying a multiphase A.-C. voltage of increasing frequency to said motors to be controlled while the rotor of said machine is braked to rest position, whereby, upon said machine rotor reaching said rest position, said first multiphase rotor winding and said first multiphase field winding will serve as transformer windings for feeding current of supply line frequency to said common line.

2. The method of synchronously controlling a plurality of synchronous motors operating from a common three-phase line by means of a rotary dynamoelectric machine having a commutator, first and second three-phase rotor windings, a first three-phase field winding and a second field winding, which comprises, energizing said first three-phase rotor winding from a three-phase supply line while short-circuiting said second field winding so that said machine will begin to operate as an induction motor, then, when said machine is operating as substantially synchronous speed, connecting two of the coils of said first three-phase field winding between two conductors of said common line and said commutator to cause D.-C. excitation current to flow in said machine, to cause said machine to operate as a synchronous motor, and to cause D.-C. magnetic blocking of the rotors of said motors to be controlled, and then connecting said second field winding to said commutator for braking the rotor of said machine, while simultaneously connecting the remaining coil of said first three-phase field winding between the remaining conductor of said common line and said commutator for supplying a three-phase A.-C. voltage of increasing frequency to said motors to be controlled while the rotor of said machine is braked to rest position, whereby, upon said machine rotor reaching said rest position, said first three-phase rotor winding and said first three-phase field winding will serve as transformer windings for feeding current of supply line frequency to said common line.

3. The method of synchronously controlling a plurality of synchronous motors operating from a common three-phase line by means of a rotary dynamoelectric machine having a commutator, first and second three-phase rotor windings, a first three-phase field winding and a second field winding, which comprises, energizing said first three-phase rotor winding from a three-phase supply line while short-circuiting said second field winding so that said machine will begin to operate as an induction motor, then, when said machine is operating as substantially synchronous speed, connecting two of the coils of said first three-phase field winding between two conductors of said common line and said commutator to cause D.-C. excitation current to flow in said machine, to cause said machine to operate as a synchronous motor, and to cause D.-C. magnetic blocking of the rotors of said motors to be controlled, and then connecting said second field winding to said commutator for braking the rotor of said machine, while simultaneously connecting the remaining coil of said first three-phase field winding between the remaining conductor of said common line and said commutator for supplying a three-phase A.-C. voltage of increasing frequency to said motors to be controlled while the rotor of said machine is braked to rest position, whereby, upon said machine rotor reaching said rest position, said first three-phase rotor winding and said first three-phase field winding will serve as transformer windings for feeding current of supply line frequency to said common line, and finally interconnecting said supply line and said common line when they are in coincident phase relationship.

References Cited in the file of this patent

UNITED STATES PATENTS

| | | |
|---|---|---|
| 1,901,650 | Hull | Mar. 14, 1933 |
| 2,394,480 | Read | Feb. 5, 1946 |